Patented July 6, 1943

2,323,869

UNITED STATES PATENT OFFICE 2,323,869

METHOD OF PREPARING GUANYL UREA FORMATE

David W. Jayne, Jr., Old Greenwich, and Harold M. Day, Cos Cob, Conn., assignors to American Cyanamid Company, New York, N. Y., a corporation of Maine No Drawing. Application November 13, 1939, Serial No. 304,207

1 Claim. (Cl. 260—501)

The present invention relates to a method of manufacturing guanyl urea formate.

In our application filed concurrently herewith, there is disclosed a method of making guanyl urea formate by reacting dicyandiamide with formic acid. When this same method was used in an attempt to produce the corresponding oxalate by reacting dicyandiamide with oxalic acid, it was rather amazing to find that instead of the oxalate, a white crystalline powder melting at 165° C. was obtained. This material, when analyzed quantitatively for nitrogen, gave a figure which corresponded to the formate rather than the oxalate. This discovery, therefore, is based upon the fact that reaction between dicyandiamide and oxalic acid under the stated conditions gives rise to the formation of guanyl urea formate.

Example

A solution of 42 grams of dicyandiamide and 63 grams of oxalic acid containing two molecules of water of crystallization (molar ratio 1:1) in 200 cc. of water was heated in an open beaker on a hot plate. When the temperature of the solution reached 70° C., a vigorous evolution of carbon dioxide began. The solution was boiled for one-half hour with continued evolution of $CO_2$ during most of the time and then cooled to room temperature. The resulting crystalline slurry was filtered, the filter cake washed with water, then acetone and finally air-dried. The product was a white crystalline powder melting at 165° C. and was identified as guanyl urea formate.

While the invention has been described with particular reference to specific embodiments, it is to be understood that it is not to be limited thereto but is to be construed broadly and restricted solely by the scope of the appended claim.

What is claimed is:

The method of making guanyl urea formate which comprises reacting dicyandiamide and oxalic acid in the molar proportion of 1:1, in aqueous solution, at a temperature exceeding 70° C. and below decomposition, cooling the reaction mixture, filtering the solids therefrom, washing the same with water and acetone and air-drying the product.

DAVID W. JAYNE, JR.
HAROLD M. DAY.